(12) United States Patent
Vondran, Jr.

(10) Patent No.: US 6,581,131 B2
(45) Date of Patent: Jun. 17, 2003

(54) METHOD AND APPARATUS FOR EFFICIENT CACHE MAPPING OF COMPRESSED VLIW INSTRUCTIONS

(75) Inventor: Gary L Vondran, Jr., San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 09/757,558

(22) Filed: Jan. 9, 2001

(65) Prior Publication Data

US 2002/0091892 A1 Jul. 11, 2002

(51) Int. Cl.$^7$ ............................................. G06F 12/00
(52) U.S. Cl. ............................ 711/3; 711/202; 711/118; 711/125; 711/137; 711/170; 710/68; 712/205; 712/24
(58) Field of Search ......................... 711/201, 3, 137, 711/213, 214, 215, 218, 217, 125, 220, 202, 170, 118; 712/24, 204, 205, 206, 207

(56) References Cited

U.S. PATENT DOCUMENTS

| | | | | |
|---|---|---|---|---|
| 5,057,837 A | | 10/1991 | Colwell et al. ................ 341/55 |
| 5,179,680 A | | 1/1993 | Colwell et al. .............. 395/425 |
| 5,652,857 A | * | 7/1997 | Shimoi et al. ................ 710/68 |
| 5,761,536 A | * | 6/1998 | Franaszek .................... 710/68 |
| 5,864,859 A | * | 1/1999 | Franaszek ................... 707/101 |
| 5,870,576 A | * | 2/1999 | Faraboschi et al. .......... 701/118 |
| 5,878,267 A | * | 3/1999 | Hampapuram et al. ....... 712/24 |
| 5,881,260 A | * | 3/1999 | Raje et al. ................... 711/213 |
| 5,893,143 A | * | 4/1999 | Tanaka et al. ............... 711/125 |
| 5,905,893 A | * | 5/1999 | Worrell ....................... 712/210 |
| 6,044,450 A | * | 3/2000 | Tsushima et al. ............ 712/215 |
| 6,131,152 A | * | 10/2000 | Ang et al. .................... 711/100 |
| 6,341,325 B2 | * | 1/2002 | Franaszek et al. ........... 711/220 |
| 6,343,354 B1 | * | 1/2002 | Breternitz, Jr. et al. ......... 711/1 |
| 6,349,372 B1 | * | 2/2002 | Benveniste et al. .......... 707/101 |
| 2001/0029577 A1 | * | 10/2001 | Worrell et al. ............... 712/210 |
| 2002/0013691 A1 | * | 1/2002 | Warnes ......................... 703/22 |

OTHER PUBLICATIONS

Larin, S.Y.; Conte, T.M., "Compiler–driven cached code compression schemes for embedded ILP processors", Microarchitecture, 1999. MICRO–32. Proceedings. 32nd Annual International Symposium on, Nov. 16, 1999, pp 82–92.*

Conte, T.M. et al., "Instruction fetch mechanisms for VLIW architectures with compressed encodings", Microarchitecture, 1996. MICRO–29. Proceedings of the 29th Annual IEEE/ACM International Symposium on, Dec. 2, 1996, pp 201–211.*

D. Patterson and J. Hennessy, "Computer Architecture A Quantitative Approach", second edition, 1996, Morgan Kaufmann Publishers, Inc., pp 372–390.*

* cited by examiner

Primary Examiner—Hong Kim

(57) ABSTRACT

A method and apparatus for efficient cache mapping of compressed Very Long Instruction Word (VLIW) instructions. In the present invention, efficient cache mapping of compressed variable length cache lines is performed by decompressing a sequence of compressed instructions to obtain decompressed cache lines and storing the decompressed cache lines in the same sequence in the cache memory. The present invention decouples the program counter based cache mapping from the memory address. In this way, a fixed increment cache pointer and variable size compressed cache line can be achieved, and, in doing so, decompressed cache lines fit nicely within the cache, in sequential order, while variable length compressed cache lines can be directly accessed without the use of a translation table.

20 Claims, 8 Drawing Sheets

METHOD AND APPARATUS FOR EFFICIENT CACHE MAPPING OF COMPRESSED VLIW INSTRUCTIONS

FIELD OF INVENTION

The present invention is directed to the efficient utilization of caches in computer architecture. Specifically, the invention is directed to a method and apparatus for efficient cache mapping of compressed cache lines containing Very Long Instruction Word (VLIW) instructions.

BACKGROUND OF THE INVENTION

Very Long Instruction Word (VLIW) architectural instructions are comprised of multiple operations packed into a single very long instruction word. A VLIW processor relies on an optimizing compiler to find useful work to fill operation slots in the VLIW. To do so, the compiler uses tools such as loop unrolling, inlining, and code motion to maximize performance. This comes at a cost of increased code size. In addition, the compiler may not be able to fill all operation slots. Thus, no-ops (no operation) are used as fillers, increasing code size further. This generally results in VLIW code size being larger than other architectures. To combat this, VLIW code may be stored in compressed form in a cache line and decompressed as the cache line is loaded from memory.

Because compressed instructions vary in size, the instruction address (i.e. program counter) is not incremented by a set value. Further, the cache location is indexed by the compressed line address. That is, the lower address bits are used to map lines into the cache. This leads to sequential lines either being mapped to the same cache location or being distributed to non-sequential entries in the cache. Both of these increasing conflict misses and reducing cache utilization, reducing overall cache performance. This problem is further explained with reference to FIGS. 1 and 2. FIG. 1 illustrates an example of inefficient mapping of compressed cache lines into an instruction cache. FIG. 2 presents a simplified view of a typical instruction cache.

FIG. 1 shows a portion of a main memory 110 in which is stored compressed instruction cache lines 120 having different lengths and being stored at memory locations (addresses) 115. The figure also shows an instruction decompression unit 125 for decompressing the compressed lines retrieved from main memory 110. The instruction cache 130 is shown having stored therein the decompressed lines 140 with corresponding instruction tag entries 135. As can be seen, sequential lines are not in order and are distributed throughout the cache. Also shown are the program counter 145 and a comparator 150. FIG. 2 shows the components of a typical instruction cache implementation and corresponds to the cache mapping shown in FIG. 1. It consists of an Instruction Cache Data RAM 210 in which the decompressed cache lines are stored, an Instruction Cache Tag RAM 215 in which the instruction tag entries are stored, a Program Counter (PC) register 220, PC increment circuitry 225, Branch logic 230, and Cache Control logic (not shown). Also shown in the figure are a comparator 240 and a memory controller 235 for controlling main memory accesses.

In the typical cache implementation of FIGS. 1 and 2, the lower bits l of the Program Counter (PC) select an entry in the Instruction Cache Tag and Instruction Data RAMs. The upper bits u of the PC are compared, in the comparator, with the value retrieved from the Cache Tag. If a match, the access is deemed a "hit." On a hit, the Instruction Cache Line retrieved from the Cache Data RAM is passed to the processor pipeline and the PC is incremented by a set amount n. If not a match, the access is deemed a "miss." On a miss, the PC is supplied as the memory address to the Memory Controller. The Memory Controller 235 retrieves from main memory the desired cache line from the memory address supplied, and loads it and the upper bits of the PC into the selected cache data and cache tag entries, respectively. The access then proceeds as a "hit."

A change in the PC sequencing can be performed through a branch instruction. A branch instruction causes the PC to be updated with a Branch Target Address, supplied in the branch instruction as an absolute or PC relative (PC plus Offset) address.

Colwell et. al., in U.S. Pat. Nos. 5,057,837 and 5,179,680 addressed the issue of no-op compression for VLIW instructions. The approach packs the useful operations of an instruction into a variable length compressed instruction. Associated with this compressed instruction is a mask word. Each bit of the mask word corresponds to an operation slot in the VLIW instruction. A mask word bit set to one specifies that a useful operation held in the compressed instruction is mapped to the operation slot. A zero specifies that a no-op occupies the slot. The VLIW instruction is reconstructed during a cache miss by expanding the compressed instruction, inserting no-ops as specified by the mask word. The reconstructed VLIW instruction and the upper bits of the program counter (PC) are loaded into the cache data and tag, respectively, at the line indexed by the lower bits of the PC. The PC is equal to the address of the compressed VLIW instruction in memory. Because the compressed instructions vary in size, the PC is not incremented by a set amount for each instruction. For this reason, the implementation also stores the next PC, computed from the mask word and current PC, into the cache line.

One disadvantage of this method is that the cache location is indexed by the compressed instruction address. As discussed earlier and shown in FIG. 1, this leads to a reduction in cache performance. One solution is to either pad or not compress critical instruction sequences. In other words, give up some compression to improve cache performance.

Another proposal is to use a virtual memory style approach in which the PC is incremented by a set value, indexing the cache with its lower bits. On a cache miss, the PC indexes a translation table, accessing the address of the compressed line in memory. The compressed line is then accessed, decompressed, and loaded into the appropriate location in the cache. This achieves efficient mapping of the decompressed lines into cache at the cost of an additional translation table access.

In today's burst memory systems, it is advantageous to minimize multiple random accesses, in favor of a multi-word bursts. A random access has latency of 5 to 15 times that of a sequential burst access. A drawback of the implementation presented above is that it requires an additional translation table access, which cannot be combined with other accesses. This could nearly double the miss penalty in certain implementations.

One proposal to avoid the added cost of table access is to use a Translation Lookaside Buffer (TLB). A TLB, in essence a cache of the translation table, works with the general assumption that the same translation (TLB entry) is used for many page accesses. In the case of compressed cache lines, a translation is associated with each cache line. Thus, a much larger TLB than usual is needed to achieve an effective TLB hit rate. Note, each cache line must be compressed independently of other cache lines. This is needed because even if the cache line does not contain a target of a branch, the line might be replaced in the cache and later reloaded. Cache lines could be compressed together in blocks; however, this will increase the miss penalty because an instruction could only be retrieved by decompressing from the beginning of the block.

An alternative is to allocate several words to each translation table entry. If the compressed cache line fits within the entry, only the translation table is accessed. Otherwise, a pointer to the remaining words of the compressed line is stored in one of the entry words. A critical design choice of this approach is the entry size. To achieve the best compression, the entry size should be as small as possible. To utilize the burst capability of the memory system, the entry size should be sufficiently large (at least 4 memory words, which is 32 bytes in a 64 bit memory system). To minimize average miss penalty, the majority of the instructions executed should fit in the entry. This may conflict with "trace scheduling", which tries to maximize Instruction Level Parallelism (ILP) for the paths most likely to be executed. The more parallelism found, the less likely it will compress well and fit in a translation table entry. It is the cache lines least likely to be executed that are most likely to compress well. Finally, to simplify the implementation, the entry size should be a power of 2. Clearly these goals are at odds with one another and may inhibit the use of the approach in certain implementations.

SUMMARY OF THE INVENTION

The inventor has developed the present invention which overcomes the drawbacks of the existing systems and avoids the reduction in cache utilization and increase in conflict misses exhibited by the system shown in FIGS. 1 and 2. Through the use of present invention, aggressive code compression can be performed without degrading instruction cache performance.

In the present invention, efficient cache mapping of compressed variable length cache lines is performed by decompressing a sequence of compressed cache lines to obtain decompressed cache lines and storing the decompressed cache lines in the same sequence in the cache memory. The present invention decouples the program counter based cache mapping from the memory address. In this way, a fixed increment cache pointer and variable size compressed cache line can be achieved, and, in doing so, decompressed lines fit nicely within the cache, in sequential order, while variable length compressed lines can be directly accessed without the use of a translation table.

The present invention includes a method of cache mapping of compressed variable length lines stored in a main memory. The method includes determining the length of a compressed line and decompressing that compressed line to obtain a decompressed line. This length is then stored, preferably in the cache memory. Furthermore, the decompressed line is stored in the cache memory. The length of the compressed line is added to a current main memory address to obtain a next main memory address. In the case of a cache miss, the main memory is accessed with said next main memory address.

More specifically described, the present invention is directed to a method and apparatus for efficient cache mapping of compressed variable length instructions. In the present invention, an entry in an instruction cache is selected based on a lower portion of a program counter. The entry comprises a tag area and a data area. The system determines whether an address stored in said tag area corresponds to that of a desired cache line. It does this by determining whether the address stored in said tag area is a match with an upper portion of the program counter.

In the case of a match, the access is deemed a "hit" and the cache line stored in said data area of the selected entry is passed to a processor pipeline. The program counter is incremented by a set amount and the memory address is incremented by a value held in a memory address increment field in the cache line.

In the case of a mismatch the access is deemed a "miss." The system retrieves the desired line from main memory based upon a memory address stored in a memory address register separately from the said program counter. The retrieved line is decompressed in an instruction decompression unit and is loaded into the data area of the selected entry in the instruction cache. Meanwhile, the upper portion of the program counter is loaded into the tag area of that selected entry in the instruction cache. The system then proceeds as above as if it were a "hit."

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

As described with reference to the accompanying figures, the present invention provides a method and apparatus for performing efficient cache mapping for compressed cache lines containing VLIW instructions. The present invention decouples the program counter based cache mapping from the memory address. In this way, a fixed increment cache pointer and variable size compressed cache line can be achieved, and, in doing so, decompressed lines fit nicely within the cache, while variable length compressed lines can be directly accessed without the use of a translation table.

Figure 1:
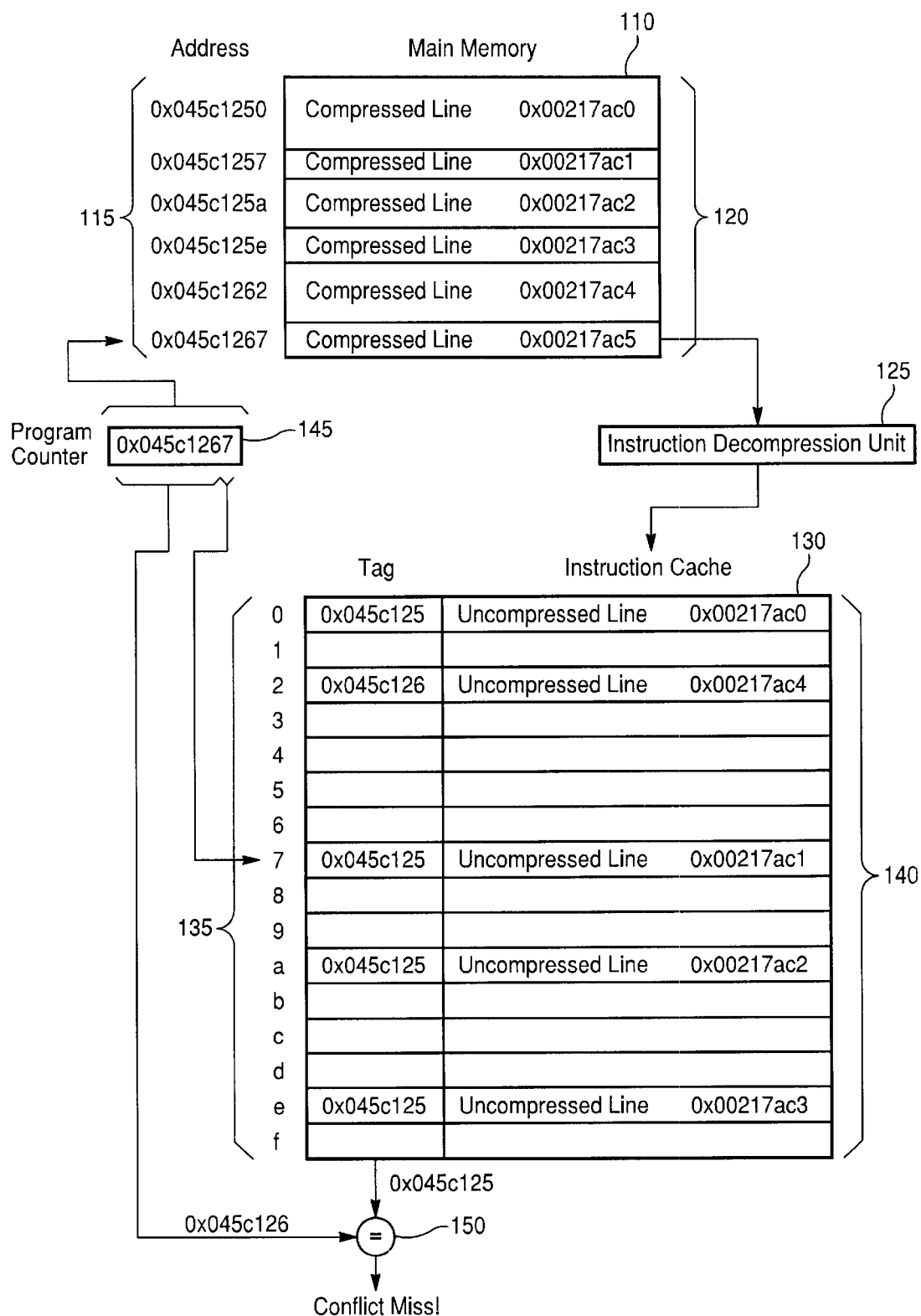
FIG. 1 is a schematic diagram illustrating an example of inefficient mapping of compressed lines into an instruction cache.
Figure 3:
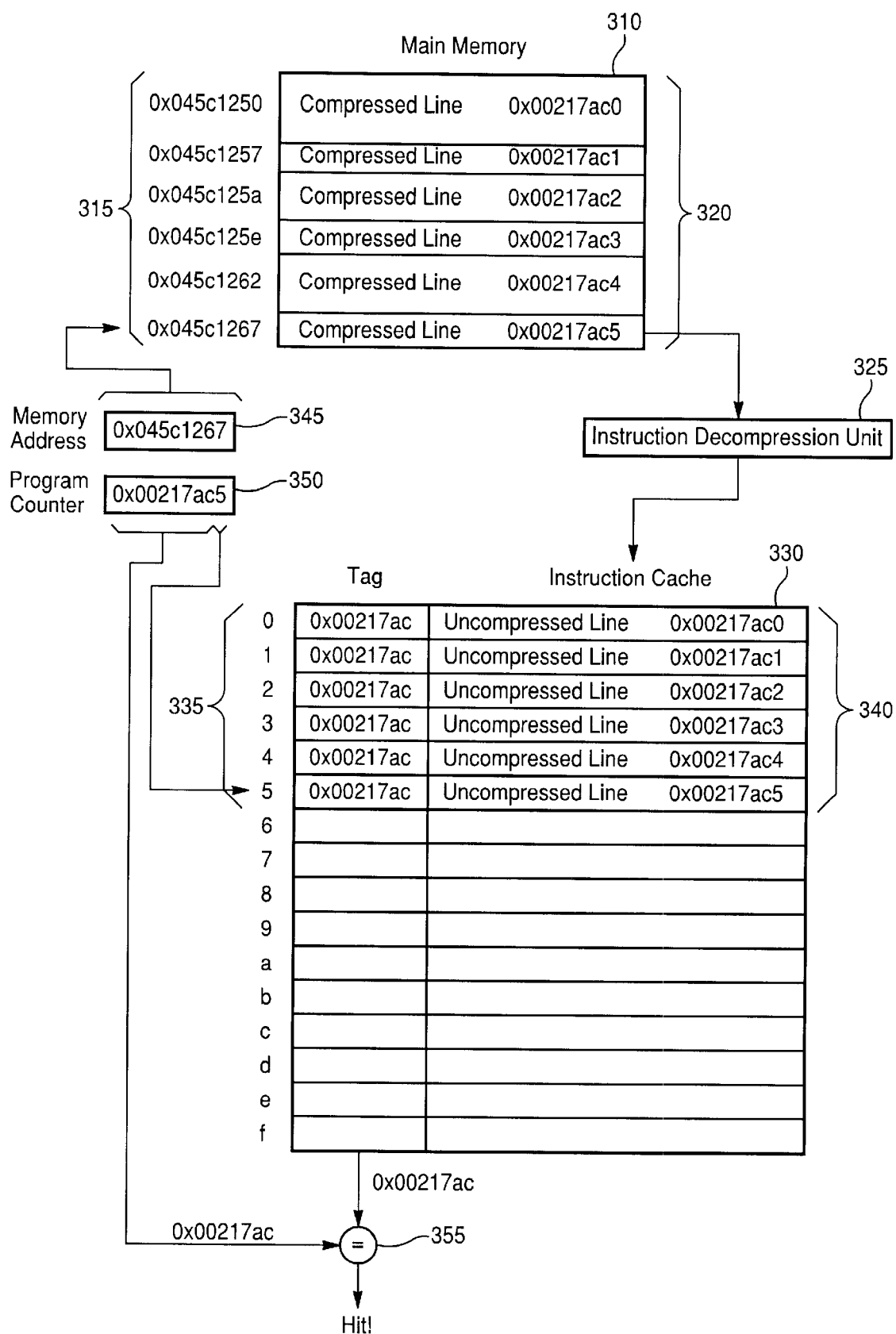
FIG. 3 is a schematic diagram illustrating the efficient mapping of compressed lines into an instruction cache in accordance with the preferred embodiment of the invention.

The effect of the present invention can be seen from FIG. 3 which illustrates the efficient mapping of compressed lines into an instruction cache in accordance with the preferred embodiment of the invention. The benefits of the present invention can be seen by comparing FIGS. 1 and 3. As with FIG. 1, FIG. 3 includes a portion of a main memory 310 in which is stored compressed cache lines 320 having different lengths and stored at memory locations (addresses) 315. FIG. 3 also shows an instruction decompression unit 325 for decompressing the compressed lines retrieved from main memory 310. The instruction cache 330 is shown having stored therein the decompressed lines 340 with corresponding instruction tag entries 335. As can be seen, sequential instructions are no longer distributed throughout the cache, unlike in the system represented by FIG. 1. Also shown is the program counter 350, a comparator 355 and, unlike the system of FIG. 1, a separate memory address register 345.

In FIG. 3 it can be seen that the decompressed instructions 340 are not distributed randomly in the cache. Sequential instructions are stored sequentially. This decreases the likelihood of conflict misses and improves cache utilization and overall performance.

Figure 4:
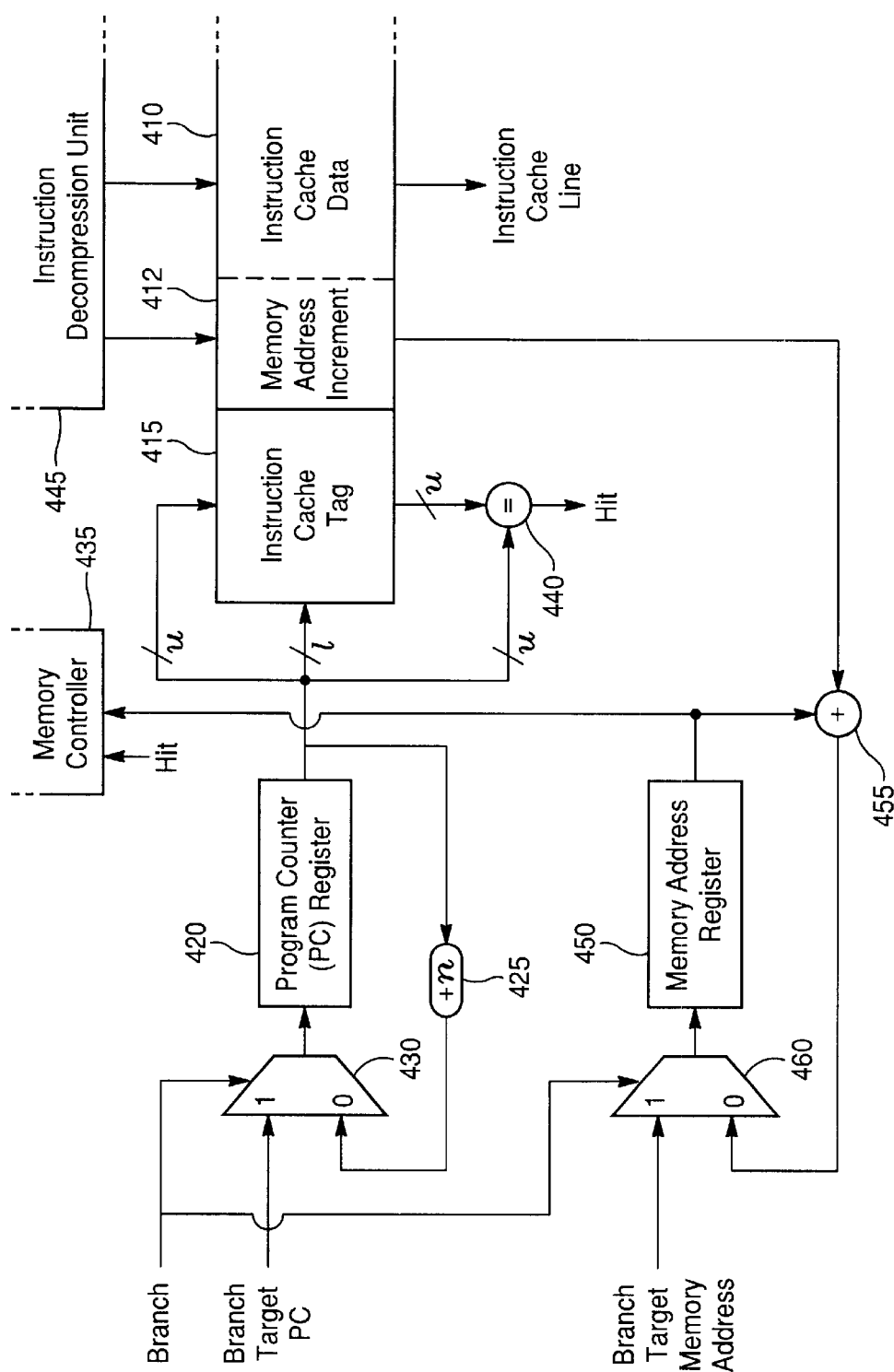
FIG. 4 is a schematic block diagram illustrating an instruction cache implementation in accordance with the preferred embodiment of the invention.

FIG. 4 illustrates an instruction cache implementation in accordance with the preferred embodiment of the invention that results in the efficient cache mapping shown in FIG. 3. It comprises of an Instruction Cache Data RAM 410 in which the decompressed lines are stored with an area for the Memory Address Increment 412 for each line. This Memory address Increment field contains the size of the compressed cache line. The implementation also includes an Instruction Cache Tag RAM 415 in which the instruction tag entries are stored, a Program Counter (PC) register 420 in which the PC is stored, PC increment circuitry 425, Branch logic 430, and Cache Control logic (not shown). Also shown in the figure is a comparator 440, a memory controller 435 for controlling a main memory and the instruction decompression unit 445. Except for the area for the memory address increment 412, these elements are similar to those shown in the system of FIG. 2. Unlike the system of FIG. 2, however, the system of the preferred embodiment of the present invention includes a memory address register 450, increment logic 455 and branch logic 460.

Figure 2:
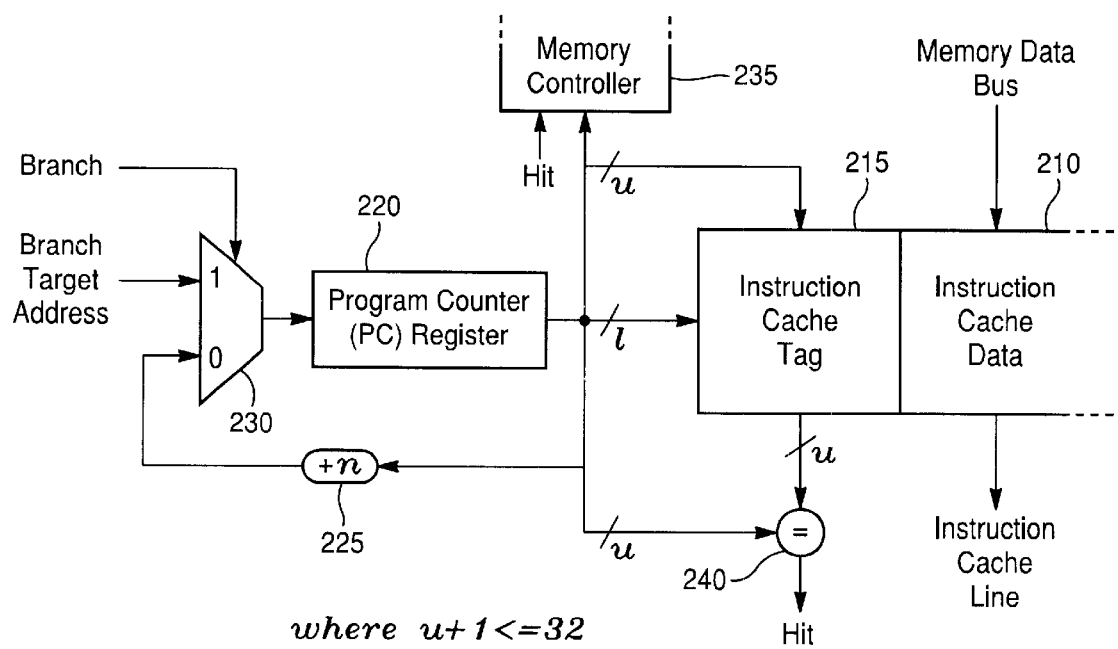
FIG. 2 is a schematic block diagram illustrating a typical instruction cache implementation.

The differences in structure and configuration between the apparatus of the preferred embodiment and that of FIG. 2 can be restated as follows: first, the addition of the Memory Address Register 450 with associated increment 455 and branch logic 460; second, the additional Memory Address Increment field 412 in the Instruction Cache Data RAM 410 that contains the size of the compressed cache line; third, it is the value stored in the Memory Address Register 450, not the value stored in the Program Counter Register 420, that is passed as the miss address to the Memory Controller 435. The value in the Memory Address Increment field of the cache line contains the size of the compressed cache line. As is described in greater detail herein, this value is used by the system to accurately increment the memory address such that it points to the next compressed cache line in main memory. The value is generated by the Instruction Decompression Unit which, while decompressing a line, keeps track of its compressed size. The value is appended to the decompressed line in a memory address increment area.

Figure 5:
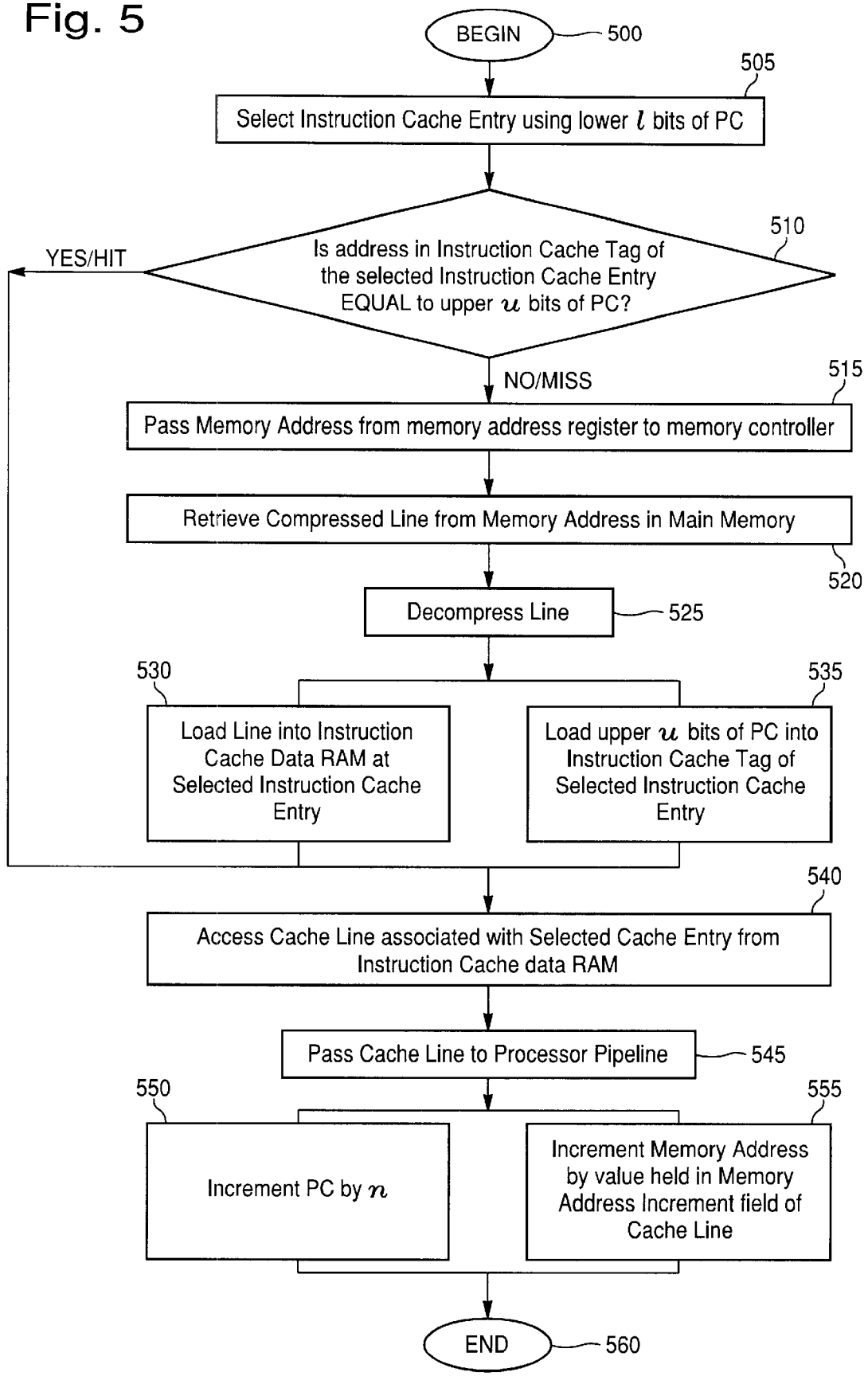
FIG. 5 is a flowchart illustrating the preferred method of invention.

The preferred method of the present invention is illustrated by a flowchart shown in FIG. 5 and is described herein with references to the elements of the implementation shown in FIGS. 3 and 4. The first step of the process is step 505 wherein the lower bits (l) of the program counter (PC), are used to select the instruction cache entry which holds the desired cache line. For example, in a 16 entry cache, 4 bits are needed to index properly; thus 4 lower bits of the PC would be used. Note the least significant bits (w) index the word within a cache line. Thus, they are not involved in indexing the line.

Next, in step 510, the address value held in the instruction cache tag associated with the selected instruction cache entry is compared to the upper bits (u) of the PC to determine whether there is a match. The upper bits (u) are the bits of the PC except the lower bits (l) and the word index (w). For example, if using a 32-bit word, an 8 word line, and a 16 entry cache, l would equal 4, w would equal 5, and u would equal 23. If, in step 510, it is determined that there is a match, the access is a deemed a "hit" and the method continues with step 540. If, in step 510, it is determined that there is a mismatch, that is, the address value held in the instruction cache tag associated with the selected instruction cache entry is not equal to the upper bits (u) of the PC, then the access is a deemed a "miss" and the method performs steps 515–535 before proceeding to step 540.

On a "hit," in step 540, the cache line associated with the selected cache entry is accessed from the Instruction Cache Data RAM. Step 545 shows that this cache line is passed to the processor pipeline. In step 550, the PC is incremented by a fixed amount n. This amount corresponds to the size of a single entry in the cache so that, when incremented by n, the PC points to the next instruction.

The cache line, when compressed has a specific size. As mentioned, when in main memory, the compressed lines have differing sizes. The value in the Memory Address Increment field of the cache line contains the compressed size of the cache line. This is used by the system to accurately increment the memory address such that it points to the next compressed line in main memory. Thus, in parallel with step 550, in step 555, the Memory Address in Memory Address Register 450 is incremented by the value held in the Memory Address Increment field of the cache line.

Note, if the cache line contains multiple instructions, the w field of the PC indexes within the line to select the desired instruction. In this case, the cache line is either stored in an instruction buffer for subsequent accesses or the same entry is repeatedly accessed until the PC index crosses a cache line boundary. In either case, the Memory Address Register is incremented only once for the series of accesses to the same line.

On a "miss," in step 515, the Memory Address is passed from the Memory Address Register 450 to the Memory Controller. In step 520, the Memory Controller retrieves the compressed line from the Memory Address in main memory and decompresses it in step 525 in the instruction decompression unit. Then, in step 530, the decompressed line is loaded into the Instruction Cache Data RAM at the selected instruction cache entry along with its compressed line size which is placed in the memory address increment field of the selected entry. At the same time, in step 535, the upper bits (u) of the PC are loaded into the Instruction Cache Tag of the selected instruction cache entry. The access then follows that of a cache hit with step 540. Note that the decompressed instruction is also sent directly to the processor pipeline in addition to the cache. In this way, the cache is updated as are the PC and memory address register, but the processor need not perform an additional access of the cache to retrieve the instruction.

Referring again to FIG. 4, a branch is executed by loading the Branch Target PC via branch logic 430 (mux) into the Program Counter Register 420 and Branch Target Memory Address via branch logic 460 (mux) into the Memory Address Register 450. Both of these are supplied in the branch instruction as either an absolute value or as PC and Memory Address relative values. Because a VLIW instruction is executed as an atomic unit, there is no requirement that the operation encodings be any particular set bit-size (i.e. a 32 bit word). Thus, a branch instruction can be extended without difficulty, there being no requirement that it fit exactly within a predefined slot size of within the VLIW instruction. Further, the Target PC is known at link time and can be compressed in the compressed instruction stream becoming a part of the VLIW instruction.

The cache configuration shown and described above in the context of the present invention is shown as an example and the scope of the present invention is not limited thereby. One skilled in the art will recognize that the present invention can be applied to other instruction cache configurations, such as a multi-set associative cache.

The present invention offers several advantages over existing systems. First, it achieves the goal of mapping variable size packed instruction cache lines in memory to sequential cache lines. This allows for instruction compression without sacrificing cache performance. In addition, this goal is achieved with minimal additional cache circuitry. A second advantage is that the implementation is not coupled to a specific instruction compression algorithm. This allows the use of more aggressive compression algorithms, such as Huffman Encoding. Third, decoupling the cache mapping from the memory address enables optimizations in mapping instruction sequences into the cache.

Figure 6:
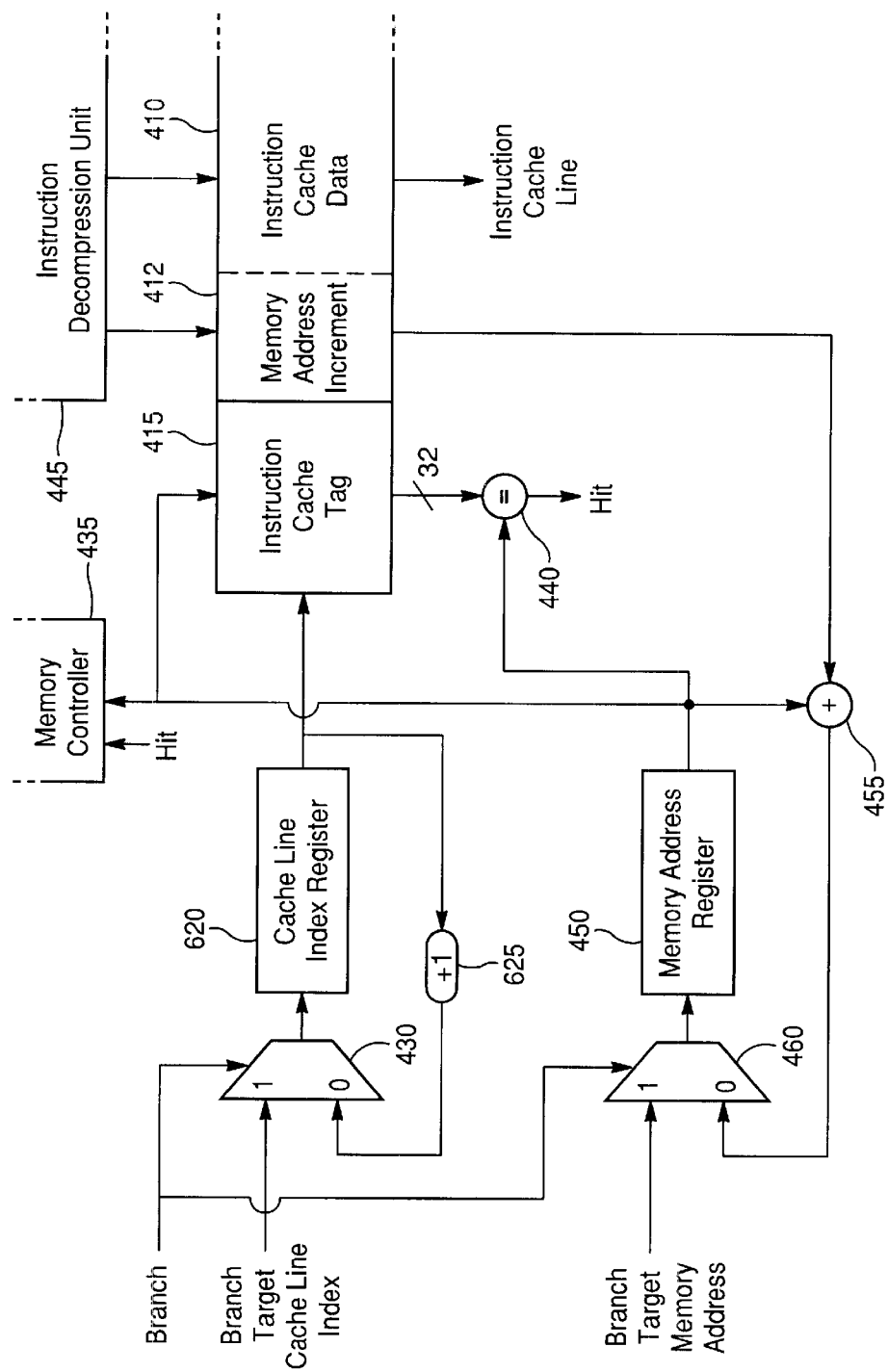
FIG. 6 is a schematic diagram illustrating an instruction cache implementation in accordance with an alternate embodiment of the invention.

An alternative embodiment of the present invention is presented in FIG. 6. This embodiment is very similar to the preferred embodiment as shown in FIG. 4 and shares most of the same structure and configuration. In this embodiment, however, the Memory Address instead of the upper bits of the PC, is used in the comparison with the Instruction Cache Tag to determine whether there is a "hit." Because the Memory Address is decoupled from the Cache index, the entire address, not just the upper bits (u), must be compared with the entire Instruction Cache Tag. Thus, in the case of a 32-bit word configuration both the Memory Address and the Instruction cache tag will contain 32 bits. In this embodiment, the PC is only used to index the cache and is thus renamed Cache Line Index Register 620. The Cache Line Index increment circuitry is shown as element 625. As the cache line index is inherently smaller in size than the program counter of the preferred embodiment, it follows that this alternate embodiment reduces the number of bits required for the Target Cache Line Index in a branch instruction.

Figure 7:
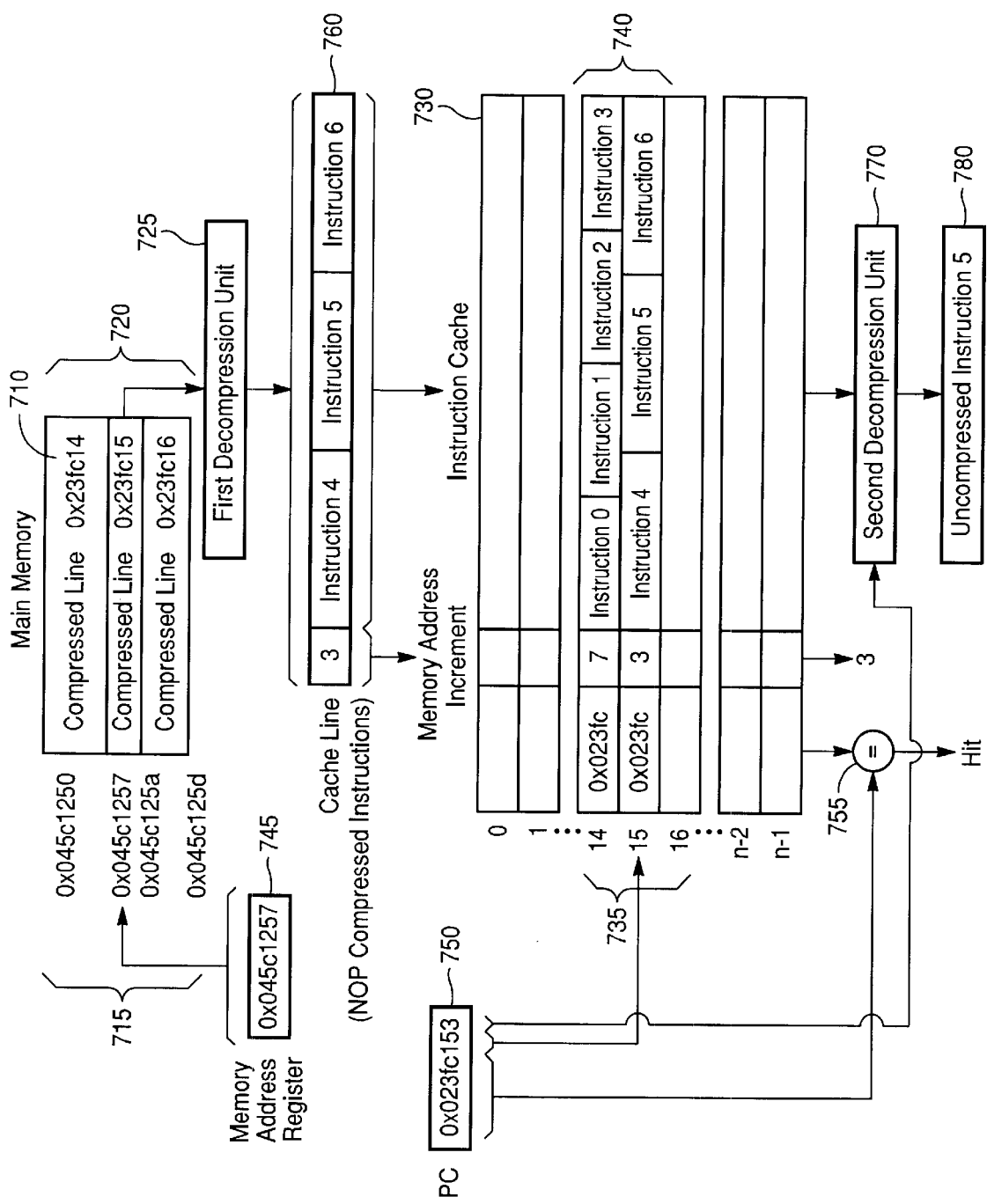
FIG. 7 is a schematic diagram illustrating a two phase cache line decompression implementation in accordance with the invention.

FIG. 7 illustrates a two phase cache line decompression implementation in accordance with the invention. A two phase decompression method can be used with either of the above described embodiments of the present invention where the cache line has been compressed twice using two different compression techniques. The main distinction is that a compressed cache line retrieved from main memory is decompressed in two phases with the instruction cache holding only partially decompressed cache lines.

The first phase is an aggressive decompression method that is performed when the line is loaded from memory into the cache (i.e. on a cache miss). The second phase would preferably be a simpler method that is performed in a pipeline stage (or stages) after the instruction is read from the instruction cache during execution. A candidate for the second phase could be the no-op removal/expansion compression presented by Colwell. The use of the two phase decompression approach increases the utilization of the cache by not wasting cache space to store no-ops.

The two phase implementation works as follows. As in FIG. 3, FIG. 7 includes a portion of a main memory 710 in which is stored compressed cache lines 720 at memory locations 715. Also shown, like FIG. 3, are the program counter 750, a comparator 755 and a separate memory address register 745. FIG. 7 further shows a first instruction decompression unit 725 for performing the first phase of decompressing the compressed lines retrieved from main memory 710 into the cache line 760. The instruction cache 730 is shown having stored therein the partially decompressed lines 740 with corresponding instruction tag entries 735. The instruction cache 730 is indexed by the (l) bits of the PC. On a cache hit, the second phase of decompression is performed on the retrieved line by the second decompression unit 770. The (w) bits of the PC index into the partially decompressed cache line to select the desired instruction to be fully decompressed. The resultant uncompressed instruction 780 is then passed to the processor pipeline.

Figure 8:
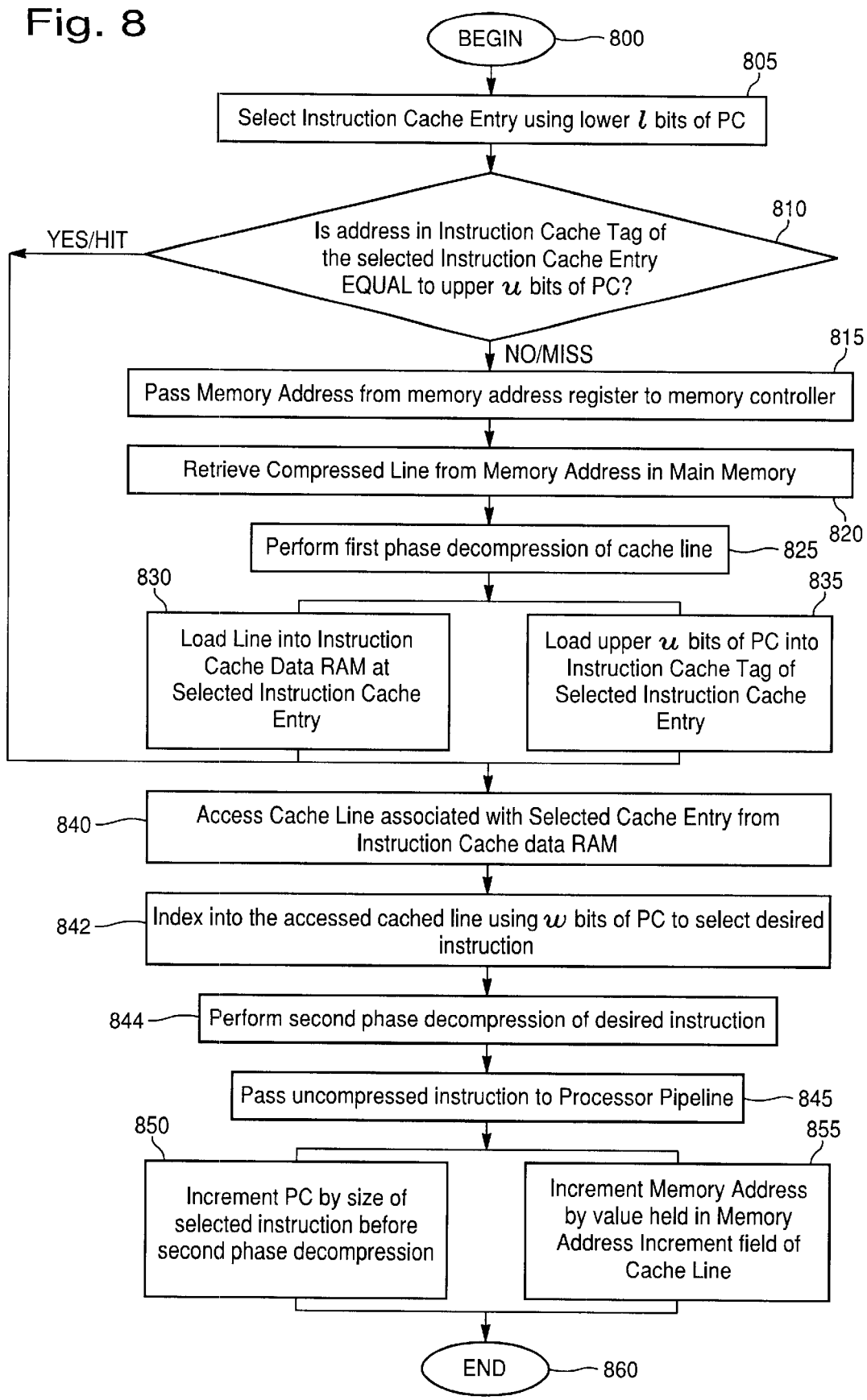
FIG. 8 is a flowchart illustrating the two-phase decompression method of the present invention.

The method of the two-phase decompression implementation is further described with reference to the flowchart presented in FIG. 8. As will be apparent, the process is very similar to that shown in FIG. 5. Where explicit mention is not made as to the function or operation of a particular step, the corresponding description of FIG. 5 applies. The first step of the process is step 805 wherein the lower bits (l) of the program counter (PC), are used to select the instruction cache entry which holds the desired cache line.

Next, in step 810, the address value held in the instruction cache tag associated with the selected instruction cache entry is compared to the upper bits (u) of the PC to determine whether there is a match. The upper bits (u) are the bits of the PC except the lower bits (l) and the word index (w). If, in step 810, it is determined that there is a match, the access is a deemed a "hit" and the method continues with step 840. If, in step 810, it is determined that there is a mismatch, that is, the address value held in the instruction cache tag associated with the selected instruction cache entry is not equal to the upper bits (u) of the PC, then the access is a deemed a "miss" and the method performs steps 815–835 before proceeding to step 840.

On a "hit," in step 840, the cache line associated with the selected cache entry is accessed from the Instruction Cache Data RAM. As shown in FIG. 7, the selected cache entry can contain multiple instructions. In step 842, the (w) bits of the PC are used to index into the accessed cache line to select the desired instruction to be decompressed. In step 844, the second phase decompression is performed on the desired instruction by the second decompression unit. Step 845 shows that this uncompressed instruction is passed to the processor pipeline. In step 850, the PC is incremented by the size of the selected instruction before it was subjected to the second phase decompression in step 844. In this way, the PC points to the next instruction.

The cache line, when compressed has a specific size. As mentioned, when in main memory, the compressed lines have differing sizes. The value in the Memory Address Increment field of the cache line contains the compressed size of the cache line. This is used by the system to accurately increment the memory address such that it points to the next compressed line in main memory. Thus, in parallel with step 850, in step 855, the Memory Address in Memory Address Register 745 is incremented by the value held in the Memory Address Increment field of the cache line.

On a "miss," in step 815, the Memory Address is passed from the Memory Address Register 745 to the Memory Controller. In step 820, the Memory Controller retrieves the compressed line from the Memory Address in main memory and performs a first phase decompression on it in step 825 in the first decompression unit. Then, in step 830, the partially decompressed line is loaded into the Instruction Cache Data RAM at the selected instruction cache entry along with its compressed line size which is placed in the memory address increment field of the selected entry. At the same time, in step 835, the upper bits (u) of the PC are loaded into the Instruction Cache Tag of the selected instruction cache entry. The access then follows that of a cache hit with step 840.

In summary, the present invention allows for the elimination of the effects of mapping variable length cache lines into the cache, by decoupling the cache indexing from the memory address. In doing so, aggressive instruction compression can be performed without reducing cache performance.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

We claim:

1. A method of cache mapping of compressed variable length cache lines stored in a main memory, said method comprising:

determining a length of a compressed cache line and decompressing said compressed cache line to obtain a decompressed cache line;

storing said length of said compressed cache line;

storing said decompressed cache line in a cache memory at a location indicated by a program counter;

adding said length of said compressed cache line to a current main memory address to obtain a next main memory address; and accessing said main memory with said next main memory address if there is a cache miss.

2. A method of cache mapping of compressed variable length cache lines according to claim 1, wherein said step of storing said length of said compressed cache line further comprises storing said length in a field in said cache memory.

3. A method of cache mapping of compressed variable length cache lines according to claim 1, method further comprising adding a fixed amount to said program counter wherein said program counter is used to index said cache memory.

4. A method of cache mapping of compressed variable length cache lines according to claim 3, said method further comprising comparing at least a portion of said program counter with a tag entry in said cache memory to determine whether there is a cache hit or a cache miss.

5. A method of cache mapping of compressed variable length cache lines, said method comprising:

a) selecting an entry in an instruction cache based on a lower portion of a program counter, wherein said entry comprises a tag area and a data area;

b) determining whether an address stored in said tag area corresponds to that of a desired cache line by determining whether the address stored in said tag area matches an upper portion of said program counter and, in the case of a match, performing steps g) through j), and in the case of a mismatch, performing steps c) through j);

c) retrieving said desired cache line from main memory based upon a memory address stored in a memory address register separately from said program counter;

d) decompressing said retrieved cache line;

e) loading said decompressed cache line into said data area of said selected entry in the instruction cache;

f) loading said upper portion of said program counter into said tag area of said selected entry in the instruction cache;

g) accessing a cache line stored in said data area of said selected entry;

h) passing said accessed cache line to a processor pipeline;

i) incrementing said program counter by a set amount; and j) incrementing said memory address by a value held in a memory address increment field in said accessed cache line.

6. A method of cache mapping of compressed variable length cache lines according to claim 5, wherein said value held in said memory address increment field corresponds to the compressed size of said desired cache line.

7. A method of cache mapping of compressed variable length cache lines according to claim 5, said method further comprising:

executing a branch, before step a), by replacing said program counter in a program counter register with a branch target program counter and replacing said memory address in said memory address register with a branch target memory address.

8. A method of cache mapping of compressed variable length cache lines, said method comprising:

a) selecting an entry in an instruction cache based on a cache line index, wherein said entry comprises a tag area and a data area;

b) determining whether an address stored in said tag area corresponds to that of a desired cache line by determining whether the address stored in said tag area matches a memory address stored in a memory address register and, in the case of a match, performing steps g) through j), and in the case of a mismatch, performing steps c) through j);

c) retrieving said desired cache line from main memory based upon said memory address stored in said memory address register separately from said cache line index;

d) decompressing said retrieved cache line;

e) loading said decompressed cache line into said data area of said selected entry in the instruction cache;

f) loading said memory address into said tag area of said selected entry in the instruction cache;

g) accessing a cache line stored in said data area of said selected entry;

h) passing said accessed cache line to a processor pipeline;

i) incrementing said cache line index by a set amount; and j) incrementing said memory address by a value held in a memory address increment field in said accessed cache line.

9. A method of cache mapping of compressed variable length cache lines according to claim 8, wherein said value held in said memory address increment field corresponds to the compressed size of said desired cache line.

10. A method of cache mapping of compressed variable length cache lines according to claim 8, said method further comprising:
   executing a branch, before step a), by replacing said cache line index in a cache line index register with a branch target cache line index and replacing said memory address in said memory address register with a branch target memory address.

11. A system for cache mapping of compressed variable length cache lines, said system comprising:
   a program counter register for storing a program counter;
   a memory address register for storing a memory address corresponding to the location of a desired cache line in main memory;
   an instruction cache for storing frequently accessed instructions wherein said cache comprises a plurality of cache entries, each entry comprising a tag area for storing a tag for a given cache line and a data area for storing an instruction for the given cache line;
   an instruction decompression unit for decompressing instruction cache lines retrieved from a main memory and storing said decompressed cache lines in the data areas of said cache entries; and
   a comparator for comparing a tag for a given cache line with at least a portion of the program counter stored in the program counter register to determine match or mismatch;
   wherein, if said comparator determines a mismatch, said memory address is used to retrieve said desired cache line from main memory and at least a portion of said program counter is used to replace said tag for the given cache line.

12. A system for cache mapping of compressed variable length cache lines according to claim 11, said system further comprising memory address increment logic for incrementing said memory address by a value found in a memory address increment field of the data area of a given cache line;
   wherein said value corresponds to the compressed size of said desired cache line.

13. A system for cache mapping of compressed variable length cache lines according to claim 11, wherein said comparator compares a tag for a given cache line with a lower bits (l) of the program counter stored in the program counter register to determine match or mismatch.

14. A system for cache mapping of compressed variable length cache lines according to claim 11, wherein said portion of said program counter used to replace said tag for a given cache line consists of an upper bits (u) of the program counter.

15. A system for cache mapping of compressed variable length cache lines, said system comprising:
   a cache line index register for storing a cache line index;
   a memory address register for storing a memory address corresponding to the location of a desired cache line in main memory;
   an instruction cache for storing frequently accessed instructions wherein said cache comprises a plurality of cache entries, each entry comprising a tag area for storing a tag for a given cache line and a data area for storing instructions for the given cache line;
   an instruction decompression unit for decompressing cache lines retrieved from a main memory and storing said decompressed cache lines in the data areas of said cache entries; and
   a comparator for comparing a tag for a given cache line with the memory address stored in said memory address register to determine match or mismatch;
   wherein, if said comparator determines a mismatch, said memory address is used to retrieve said desired cache line from main memory and is used to replace said tag for the given cache line.

16. A system for cache mapping of compressed variable length cache lines according to claim 15, said system further comprising memory address increment logic for incrementing said memory address by a value found in a memory address increment field of the data area of a given cache line;
   wherein said value corresponds to the compressed size of said desired cache line.

17. A method of cache mapping of compressed variable length cache lines, said method comprising:
   a) selecting an entry in an instruction cache based on a first lower portion of a program counter, wherein said entry comprises a tag area and a data area;
   b) determining whether an address stored in said tag area corresponds to that of a desired cache line by determining whether the address stored in said tag area matches an upper portion of said program counter and, in the case of a match, performing steps g) through l), and in the case of a mismatch, performing steps c) through l);
   c) retrieving said desired cache line from main memory based upon a memory address stored in a memory address register separately from said program counter;
   d) partially decompressing said retrieved cache line through performance of a first phase decompression;
   e) loading said partially decompressed cache line into said data area of said selected entry in the instruction cache;
   f) loading said upper portion of said program counter into said tag area of said selected entry in the instruction cache;
   g) accessing a cache line stored in said data area of said selected entry;
   h) selecting a desired instruction from said accessed cache line using a second lower portion of said program counter;
   i) uncompressing said selected instruction through performance of a second phase decompression;
   j) passing said uncompressed instruction to a processor pipeline;
   k) incrementing said program counter by an amount corresponding to the size of the selected instruction before performance of the second phase decompression; and
   l) incrementing said memory address by a value held in a memory address increment field in said accessed cache line.

18. A method of cache mapping of compressed variable length cache lines according to claim 17, wherein said value held in said memory address increment field corresponds to the compressed size of said desired cache line.

19. A system for cache mapping of compressed variable length cache lines, said system comprising:
   a program counter register for storing a program counter;
   a memory address register for storing a memory address corresponding to the location of a desired cache line in main memory;
   an instruction cache for storing frequently accessed instructions wherein said cache comprises a plurality of cache entries, each entry comprising a tag area for storing a tag for a given cache line and a data area for storing an instruction for the given cache line;

a first decompression unit for partially decompressing instruction cache lines retrieved from a main memory and storing said partially decompressed cache lines in the data areas of said cache entries; and a comparator for comparing a tag for a given partially decompressed cache line with at least a portion of the program counter stored in the program counter register to determine match or mismatch;

a second decompression unit for completing decompression of a selected instruction from within the partially decompressed cache line;

wherein, if said comparator determines a mismatch, said memory address is used to retrieve said desired cache line from main memory and at least a portion of said program counter is used to replace said tag for the given cache line.

20. A system for cache mapping of compressed variable length cache lines according to claim 19, said system further comprising memory address increment logic for incrementing said memory address by a value found in a memory address increment field of the data area of a given cache line;

wherein said value corresponds to the compressed size of said desired cache line.

* * * * *

UNITED STATES PATENT AND TRADEMARK OFFICE
CERTIFICATE OF CORRECTION

PATENT NO. : 6,581,131 B2  Page 1 of 1
DATED : June 17, 2003
INVENTOR(S) : Gary L. Vondran, Jr.

It is certified that error appears in the above-identified patent and that said Letters Patent is hereby corrected as shown below:

Column 9,
Line 54, after "claim 1," insert -- said --

Signed and Sealed this

Twenty-second Day of February, 2005

JON W. DUDAS
*Director of the United States Patent and Trademark Office*